Patented Apr. 17, 1951

2,549,270

UNITED STATES PATENT OFFICE 2,549,270

LUBRICANT AND HYDRAULIC FLUID COMPOSITION

Forrest J. Watson, Oakland, Calif., assignor to Shell Development Company, San Francisco, Calif., a corporation of Delaware No Drawing. Application July 19, 1948,
Serial No. 39,591

17 Claims. (Cl. 252—78)

The present invention relates to an improved oleaginous composition especially useful at low operating temperatures. More particularly, it is directed to compositions containing a major amount of a special mixture of organic phosphates.

Compositions suitable for special purposes, such as low temperature lubrication and the operation of hydraulic mechanisms, require a combination of properties which ordinary oils fail to meet in many respects. The special fluids contemplated are those to be used in hydraulic systems, recoil mechanisms and fluid-drive power transmissions, as well as special lubricating purposes which require the combination of properties described below. The properties which are required for safety and low temperature operation include low pour point so that the composition may operate at temperatures at least as low as −60° F. Another important property which is required for such uses is a flat viscosity-temperature curve, i. e., a high viscosity index, so that the oil is operable over a wide range of temperatures, such as are encountered in the operation of aircraft. An important property which must be considered for both commercial aircraft and military use is minimum flammability. Other inherent qualities include a relatively high boiling point, low corrosion characteristics and low oxidation susceptibility.

Numerous compositions have been suggested for the above purposes. Among these are various phosphates, none of which possess the unique combination of desirable characteristics inherent in the compositions of the present invention. For example, the lower alkyl phosphates exhibit high wear characteristics, are somewhat flammable, due in part to their volatility and, at low temperatures, exhibit incompatibility with thickeners such as polymerized esters of methacrylic acid. The tricresyl phosphates, which have been suggested for many years as possible hydraulic fluids, possess poor viscosity indices and show a low response to viscosity index improvers such as the polymerized methacrylic acid esters. This latter property may be due to the fact that the tricresyl phosphates appear to be incompatible with the polymer even at ordinary room temperatures. Unsubstituted aryl phosphates, such as triphenyl phosphate, cannot be used, due to the fact that they are solids even above room temperature. Mixed phosphates, such as diphenyl octyl phosphate, exhibit extremely high copper and cadmium corrosion and are partially incompatible with polymerized methacrylic acid esters at low temperatures.

It is an object of the present invention to provide oleaginous compositions useful for the operation of apparatus at low temperatures and with a maximum of safety from fire. It is another object of the present invention to provide compositions especially useful as aircraft hydraulic fluids. It is a third object of the present invention to provide improved organic phosphate compositions for the uses described above.

Now, in accordance with the present invention, it has been found that the above, and other objects, may be obtained by a special mixture of tricresyl phosphates with alkyl phosphates wherein the alkyl groups each have four to eight carbon atoms, the above mixture being improved by the addition of viscosity index improvers, especially polymerized esters of methacrylic acid, as more particularly described hereinafter. The individual components of the composition will be discussed below.

TRIALKYL PHOSPHATES

The trialkyl phosphates to be used in the present invention may be present in amounts from 50% to 85% by weight and preferably from 65% to 80% by weight. The phosphates which give optimum results are those wherein each of the three alkyl groups has from four to eight carbon atoms. These may be either in a straight-chain or in branched configuration, the latter being preferred. A single phosphate may contain the same alkyl groups in all three positions or may possess a mixture of alkyl groups, provided that each of those present meets the limitations described herein. Mixtures of trialkyl phosphates may be used. Suitable species include tributyl phosphates, trihexyl phosphates, trioctyl phosphates, especially the branched homologues, such as tri(2-ethylbutyl)phosphate and tri(2-ethylhexyl)phosphate. The physical characteristics of typical phosphates are given below.

*Properties of alkyl phosphates*

| | Tri-n-Butyl | Tri-n-Amyl | Tri-2-Ethyl-Butyl | Tri-n-Hexyl | Tri-2-Ethyl-Hexyl | Tri-n-Octyl |
|---|---|---|---|---|---|---|
| Boiling Point, ° C. at 1 mm | 113.8 | 129.1 | 146.4 | 166.1 | 186.3 | 211.0 |
| Freezing Point, ° F | [1] −50 | [1] −50 | [1] −50 | [1] −50 | [1] −50 | [1] −30 |
| Open-Cup Flash, ° F | 340 | 355 | | 410 | 400 | 440 |
| Open-Cup Fire, ° F | 380 | 380 | | 445 | 460 | 515 |
| Viscosity, Centistokes at 210° F | 1.06 | 1.36 | 1.68 | 1.76 | 2.29 | 2.49 |
| Viscosity, Centistokes at 100° F | 2.66 | 3.79 | 4.79 | 4.75 | 8.27 | 8.45 |
| Viscosity, Centistokes at −40° F | 46.9 | 114 | 240 | 153 | 847 | |
| Viscosity Index | 89 | 91 | 122 | 150 | 96 | 135 |

[1] Lower than.

TRICRESYL PHOSPHATES

The commercially available mixtures of tricresyl phosphates include tri-ortho-cresyl phosphate, tri-meta-cresyl phosphate and tri-para-cresyl phosphate, as well as minor amounts of mixed cresyl phosphates. The cresyl phosphates may be used in the compositions of the present invention in amounts from 10% to 40% by weight thereof, preferably 10% to 25% by weight. The commercially available tricresyl phosphate mixtures largely predominate in tri-ortho-cresyl-phosphate, which has a boiling point of 263° C. at 20 mm. mercury pressure. Mixtures containing predominating amounts of the paracresyl phosphates should be avoided due to their relatively high melting point. While mixtures are the most readily available, the ortho or metacresyl phosphates may be the only species employed in special cases.

VISCOSITY INDEX IMPROVING AGENTS

The agents to be used in the present compositions include polymerized esters of the acrylic acid series, such as acrylic acid esters and, more preferably, methacrylic acid esters. The latter are readily available as commercial products and are sold under the trade-name "Acryloid." The esters to be used should have molecular weights from about 5,000 to about 25,000, preferably 5,000 to 15,000. It will be understood that this is an average figure for the mixture of polymers, which is always present.

The acids should be esterified with aliphatic alcohols having two to fifteen carbon atoms, and the polymers may be homopolymers of a single ester or may be copolymers of a mixture of such esters. The term "polymerized esters" will be understood to include both of these types.

The polymeric esters are generally available as concentrated dispersions in a solvent such as kerosene. The commercially available varieties usually contain about equal amounts of the polymer and solvent.

CORROSION INHIBITORS

While the compositions described above exhibit excellent corrosion characteristics, it is preferable to include certain corrosion inhibitors to protect equipment for extended use. It has been found that epoxide compounds are especially effective. The glycidyl ethers are most highly preferred, and of these the glycidyl ethers containing one carbocyclic group directly attached to the ether oxygen atom provide maximum protection against corrosion, especially of copper and cadmium. Specific glycidyl ethers which may be employed include phenyl glycidyl ethers, glycidyl benzyl ethers and glycidyl cyclohexyl ethers. Other epoxide compounds which may be employed include the lower alkyl glycidyl ethers, such as glycidyl methyl ether and glycidyl isopropyl ether, as well as isobutylene oxide and butadiene monoxide.

While the above types of corrosion inhibitors are preferred for use in the present invention, other inhibitors may be used as well. such as hydroxyaromatic carboxylic acids, alkyl malonic acids, condensation products of sulfolanols with unsaturated carboxylic acids and the polyvalent metal salts of hydrocarbon sulfonic acids.

If corrosion inhibitors are employed in the present compositions, they may be present in amounts from about 0.5% to 5% by weight, preferably 1% to 2% by weight.

OTHER COMPONENTS

It is evident that the above compositions may be modified by the addition of other suitable ingredients as long as they are in minor proportions, relative to the mixture of phosphates described. Such optional ingredients include mineral oils, synthetic oils, oxidation inhibitors and flame-proofing compounds.

Suitable synthetic lubricants which may be employed include especially the polymerized alkylene oxides or glycols, such as polymeric 1,2-propylene oxide and polymerized trimethylene glycol. Another type which has been found satisfactory includes esters of dicarboxylic acids, such as the sebacates and adipates, as well as other acids having four to twelve carbon atoms, said acids being esterified with alcohols having two to fifteen carbon atoms, such as di(2-ethylhexyl) sebacate.

Oxidation inhibitors which may be employed include amines, amino phenols, and other substituted phenols. Flame-proofing agents which may be added are exemplified by methylene iodide and may be present in amounts up to about 10% by weight of the composition.

The following examples illustrate the present invention.

EXAMPLE I

The following composition was prepared by stirring the following ingredients together:

| | Parts by weight |
|---|---|
| Tri(2-ethylhexyl) phosphate | 80.0 |
| Tricresyl phosphates | 15.0 |
| Acryloid HF855 | 4.0 |
| Glycidyl phenyl ether | 1.0 |

The above composition had the following properties:

| | |
|---|---|
| Viscosity, centistokes, 100° F | 14.71 |
| Viscosity, centistokes, 210° F | 3.77 |
| Viscosity, centistokes, −40° F | 2500 |
| Viscosity index | 169 |
| Pour point, °F., lower than | −65 |
| Flash point, °F | 380 |
| Fire point, °F | 450 |
| Acid neut. No | 0.2 |

EXAMPLE II

The composition described in Example I was used as the hydraulic fluid in a Vickers hydraulic pump operated at 1,000 lbs. p. s. i. for fifty hours at 160° F. The hydraulic fluid completed approximately 15,000 cycles through the pump under these conditions. This type of pump is similar to that employed on the smaller army and navy aircraft. It was found that the acid neutralization number of the used oil was substantially that of the original oil and that the viscosity at 100° F. dropped about one-third as much as comparable petroleum-base hydraulic fluid. Corrosion was negligible.

EXAMPLE III

In order to obtain accelerated corrosion data, the composition described in Example I was subjected to the test described in the Army-Navy periodical specification for hydraulic oils, AN-0366, June 1947. After one week at 121° C., as prescribed for the test, the following corrosion data were obtained:

| Metal | Milligrams/cm.² | |
|---|---|---|
| | Loss | Gain |
| Copper | .09 | |
| Magnesium Alloy | | .02 |
| Low Carbon Steel | | .02 |
| Cadmium Plated Steel | | .09 |
| Aluminum Alloy | 0.00 | |

EXAMPLE IV

The following composition was prepared by stirring the ingredients described below:

| Ingredients: | Per cent by weight |
|---|---|
| Tricresyl phosphates | 40.0 |
| Tri(2-ethylhexyl) phosphate | 55.0 |
| Acryloid HF855 | 5.0 |

The composition was found to have the following properties:

| | |
|---|---|
| Viscosity, centistokes, −40° F | 11,000 |
| Viscosity, centistokes, 100° F | 21.8 |
| Viscosity, centistokes, 210° F | 4.86 |
| Viscosity index | 160 |
| Pour point, °F | −60 |

I claim as my invention:

1. A composition of matter consisting of the following ingredients:

| | Parts by weight |
|---|---|
| Tri(2-ethylhexyl) phosphate | 80.0 |
| Tricresyl phosphates | 15.0 |
| Methacrylic acid ester polymer, 5,000–15,000 molecular weight | 2.0 |
| Kerosene carrier for said polymer | 2.0 |
| Glycidyl phenyl ether | 1.0 |

2. A composition of matter consisting essentially of 50–85 per cent by weight of a trialkyl phosphate, each alkyl radical of which contains 4–8 carbon atoms, 10–40 per cent by weight of tricresyl phosphates, and a minor amount sufficient to thicken said phosphates of up to 10 per cent by weight of a linear polymer of methacrylic acid esters having a molecular weight within the range of 5,000 to 25,000 and 0.5–5 per cent by weight of a glycidyl ether.

3. A composition of matter consisting essentially of 50–85 per cent by weight of tri(2-ethylhexyl)phosphate, 10–40 per cent by weight of tricresyl phosphates and a minor amount sufficient to thicken said phosphates of up to 10 per cent by weight of a linear polymer of methacrylic acid esters having a molecular weight within the range of 5,000 to 25,000.

4. A composition of matter consisting essentially of 50–85 per cent by weight of a trialkyl phosphate, each alkyl radical of which contains 4–8 carbon atoms, 10–40 per cent by weight of tricresyl phosphates and a minor amount sufficient to thicken said phosphates of a linear polymer of methacrylic acid esters of an aliphatic alcohol having 2 to 15 carbon atoms.

5. A composition of matter comprising 50–85 per cent by weight of a trialkyl phosphate, each alkyl radical of which is a branched chain containing 4–8 carbon atoms, 10–40 per cent by weight of tricresyl phosphates and a minor amount sufficient to thicken said phosphates of a linear polymer of methacrylic acid esters of an aliphatic alcohol having 2 to 15 carbon atoms.

6. A composition of matter comprising 65–80 per cent by weight of a trialkyl phosphate, each alkyl group of said phosphate having 4–8 carbon atoms, 10–25 per cent by weight of tricresyl phosphates and 2–5 per cent by weight of a linear polymer of methacrylic acid esters having a molecular weight within the range of 5,000 to 15,000.

7. A composition of matter comprising 50–85 per cent by weight of a trialkyl phosphate, each alkyl radical of which contains 4–8 carbon atoms, 10–40 per cent by weight of tricresyl phosphates and a minor amount sufficient to thicken said phosphates of a linear polymer of methacrylic acid esters having a molecular weight within the range of 5,000 to 25,000.

8. A composition of matter comprising 50–85 per cent by weight of a trialkyl phosphate, each alkyl group of which contains 4 to 8 carbon atoms, 10–40 per cent by weight of tricresyl phosphates, a minor amount sufficient to thicken said phosphates but less than 10 per cent by weight of a linear polymer of methacrylic acid esters having a molecular weight range of 5,000 to 25,000 and 0.5 to 5 per cent by weight of an epoxide compound of the group consisting of glycidyl ethers and hydrocarbon epoxides.

9. A composition of matter comprising 50–85 per cent by weight of a trioctyl phosphate, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of a glycidyl ether.

10. A composition of matter comprising 50–85 per cent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of glycidyl phenyl ether.

11. A composition of matter comprising 50–85 per cent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of a glycidyl carbocyclic ether.

12. A composition of matter comprising 50–85 per cent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of glycidyl cyclohexyl ether.

13. A composition of matter comprising 50–85 percent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of a glycidyl alkyl ether.

14. A composition of matter comprising 50–85 per cent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters having a molecular weight within the range of 5,000 to 25,000 and 0.5–5 per cent by weight of a glycidyl isopropyl ether.

15. A composition of matter comprising 50–85 per cent by weight of a trialkyl phosphate, each alkyl radical of which contains 4–8 carbon atoms, 10–40 per cent by weight of tricresyl phosphates, a minor amount sufficient to thicken said phosphates of up to 10 per cent by weight of a linear polymer of methacrylic acid esters of an aliphatic alcohol having 2 to 15 carbon atoms, said polymer having a molecular weight within the range of 5,000 to 25,000 and 0.5-5 per cent by weight of a glycidyl ether.

16. A composition of matter comprising 65-80 per cent by weight of a trialkyl phosphate, each alkylradical of which contains 4-8 carbon atoms, 10-25 per cent by weight of tricresyl phosphates, 2-5 per cent by weight of a linear polymer of methacrylic acid esters having a molecular weight within the range of 5,000 to 25,000 and 1-2 per cent by weight of a glycidyl ether.

17. A composition of matter comprising 50-85 per cent by weight of a trialkyl phosphate, each alkyl radical of which contains 4-8 carbon atoms, 10-40% by weight of tricresyl phosphates, and a minor amount sufficient to thicken said phosphates of a linear polymeric ester of the acrylic acid series having an average molecular weight within the range 5,000 to 25,000.

FORREST J. WATSON.

REFERENCES CITED

The following references are of record in the file of this patent:

UNITED STATES PATENTS

| Number | Name | Date |
| --- | --- | --- |
| 2,091,627 | Bruson | Aug. 31, 1937 |
| 2,102,825 | Woodhouse et al. | Dec. 21, 1937 |
| 2,237,336 | Caprio | Apr. 8, 1941 |
| 2,245,649 | Caprio | June 17, 1941 |
| 2,395,380 | Morgan et al. | Feb. 19, 1946 |
| 2,396,191 | Morgan et al. | Mar. 5, 1946 |
| 2,410,608 | Morgan | Nov. 5, 1946 |
| 2,438,446 | Leland | Mar. 23, 1948 |
| 2,442,741 | Morgan et al. | June 1, 1948 |